United States Patent [19]

Collins, Jr. et al.

[11] Patent Number: 5,665,955
[45] Date of Patent: Sep. 9, 1997

[54] VERTICALLY MOUNTED BAR CODE SCANNER ASSEMBLY

[75] Inventors: Donald A. Collins, Jr., Duluth; Rex A. Aleshire, Buford, both of Ga.

[73] Assignee: NCR Corporation, Dayton, Ohio

[21] Appl. No.: 733,349

[22] Filed: Oct. 17, 1996

Related U.S. Application Data

[63] Continuation of Ser. No. 392,567, Feb. 23, 1995, abandoned.

[51] Int. Cl.⁶ ................................................. G06K 7/10
[52] U.S. Cl. ........................ 235/462; 235/467; 235/472; 235/383
[58] Field of Search ............................ 235/467, 472, 235/462, 383; 248/27.3

[56] References Cited

U.S. PATENT DOCUMENTS

| | | | |
|---|---|---|---|
| 4,020,924 | 5/1977 | Conrotto et al. | 186/1 A |
| 4,170,404 | 10/1979 | Meye et al. | 350/252 |
| 4,372,519 | 2/1983 | Huntoon | 248/466 |
| 4,593,186 | 6/1986 | Swartz | 235/472 |
| 4,687,165 | 8/1987 | Blackburn | 248/274 |
| 4,762,984 | 8/1988 | Knowles et al. | 235/383 |
| 5,140,141 | 8/1992 | Inagaki et al. | 235/467 |
| 5,198,650 | 3/1993 | Wike, Jr. | 235/472 |
| 5,232,185 | 8/1993 | Schorr et al. | 248/27.3 |
| 5,246,192 | 9/1993 | Aberi et al. | 248/178 |
| 5,463,213 | 10/1995 | Honda | 235/472 |

*Primary Examiner*—Harold Pitts
*Attorney, Agent, or Firm*—Paul W. Martin

[57] ABSTRACT

A vertically mounted bar code scanner assembly which is an alternative to a scanner having integral mounting hardware. The assembly includes a modular scanner having a back surface and a front surface containing a scanning aperture which emits scanning light beams, a mounting bracket including a bottom wall which fastens to a substantially horizontal mounting surface and a vertical wall coupled to the bottom wall. The vertical wall of the mounting bracket couples to the back surface of the scanner, placing the scanning aperture in a substantially vertical orientation.

3 Claims, 4 Drawing Sheets

VERTICALLY MOUNTED BAR CODE SCANNER ASSEMBLY

This is a continuation of application Ser. No. 08/392,567 filed on Feb. 22, 1995, now abandoned.

BACKGROUND OF THE INVENTION

The present invention relates to bar code scanners and mounting hardware, and more specifically to a vertically mounted bar code scanner assembly.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

Bar code scanners may be directly mounted to the top surface of the checkout scanner in a vertical manner. However, such scanners are typically specialized for such use and not able to be used in other configurations thus requiring separate scanners to be manufactured for separate applications. Therefore, it would be desirable to provide a vertically mounted bar code scanner assembly which employs a modular scanner that may be employed in other ways.

SUMMARY OF THE INVENTION

In accordance with the teachings of the present invention, a vertically mounted bar code scanner assembly is provided. The assembly includes a scanner having a back surface and a front surface containing a scanning aperture which emits scanning light beams, a mounting bracket including a bottom wall which fastens to a substantially horizontal mounting surface and a vertical wall coupled to the bottom wall. The vertical wall of the mounting bracket couples to the back surface of the scanner, placing the scanning aperture in a substantially vertical orientation.

It is accordingly an object of the present invention to provide a vertically mounted bar code scanner assembly.

It is another object of the present invention to provide a vertically mounted bar code scanner assembly which allows the scanner to be easily removed.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
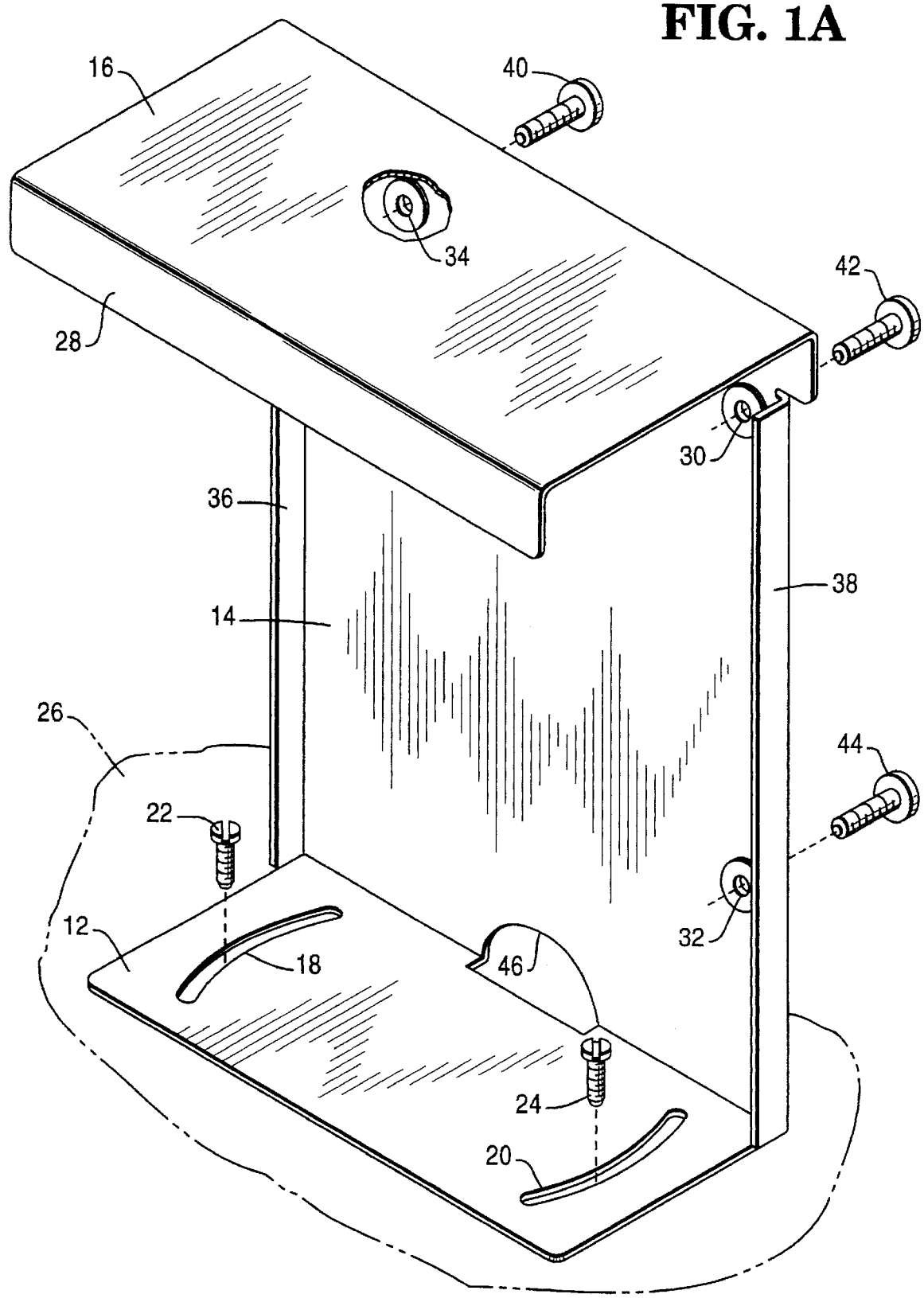
FIGS. 1A and 1B are front and rear perspective views of a mounting apparatus.
Figure 1B:
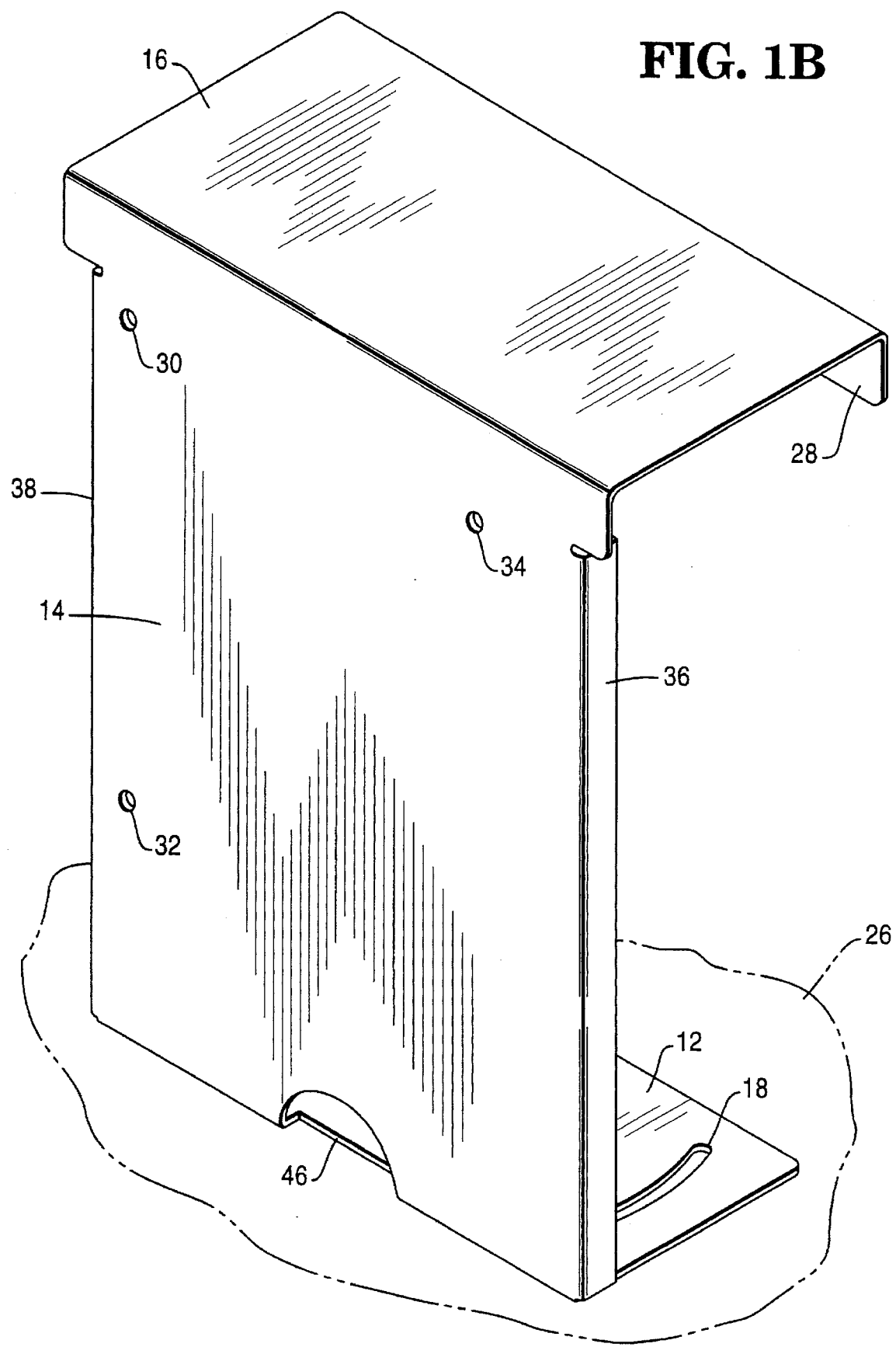

Referring now to FIGS. 1A and 1B, mounting bracket 10 has a bottom wall 12, back wall 14, and top wall 16. Mounting bracket 10 is preferably made of sheet metal.

Bottom wall 12 includes apertures 18 and 20 through which screws 22 and 24 pass for securing mounting bracket 10 to checkout counter surface 26.

Top wall 16 includes a front lip 28.

Figure 2:
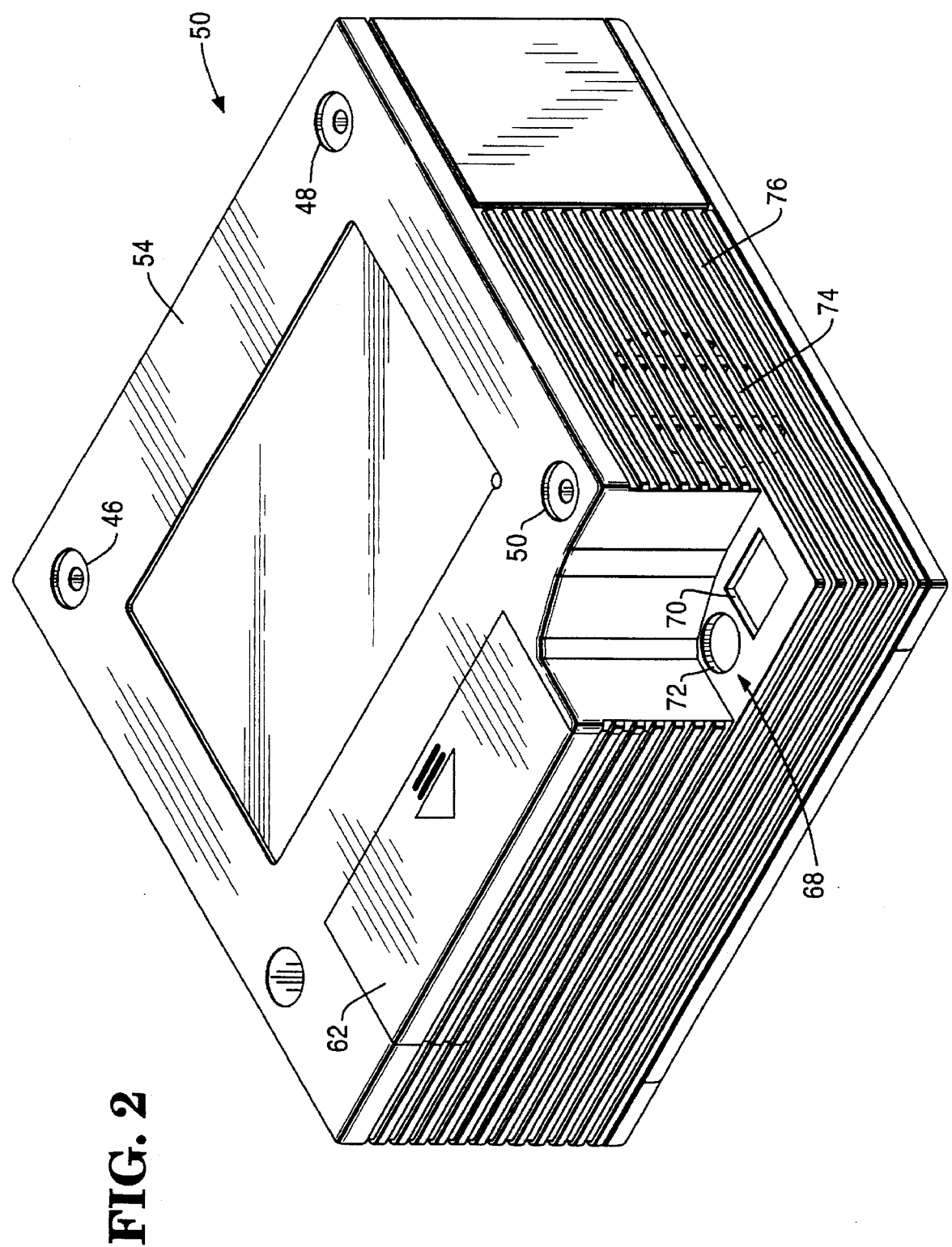
FIG. 2 is a bottom perspective view of a bar code scanner.

Back wall 14 joins bottom wall 12 and top wall 16. Back wall includes fastener guides 30–34 which align with and protrude into fastener apertures 46–50 within the back surface 54 of scanner 50 (FIG. 2). Screws 40–44 fasten scanner 50 to mounting bracket 10. Back wall 14 also includes side lips 36 and 38 which provide mounting bracket 10 with added rigidity.

Mounting bracket 10 also includes an aperture 46 at the intersection of back wall 14 with bottom wall 12. Aperture 46 provides a path through which wire cables 73 (FIG. 2) from scanner 50 pass.

Turning now to FIG. 2, scanner 50 is generally box-like in shape and includes back surface 54. Back surface 44 includes fastener apertures 56–60 which couple to fastener guides 30–34 when scanner 50 is installed within mounting bracket 10.

Access panel 62 on left side 63 slides off to expose firmware 64 and diagnostic port 66.

An indent portion 68 includes power and signal connectors 70 and 72. Indent portion 68 provides space between back wall 14 and connectors 70 and 72 for cables 73 to connect with connectors 70 and 72.

A fan 74 is located on bottom side 76.

Figure 3:
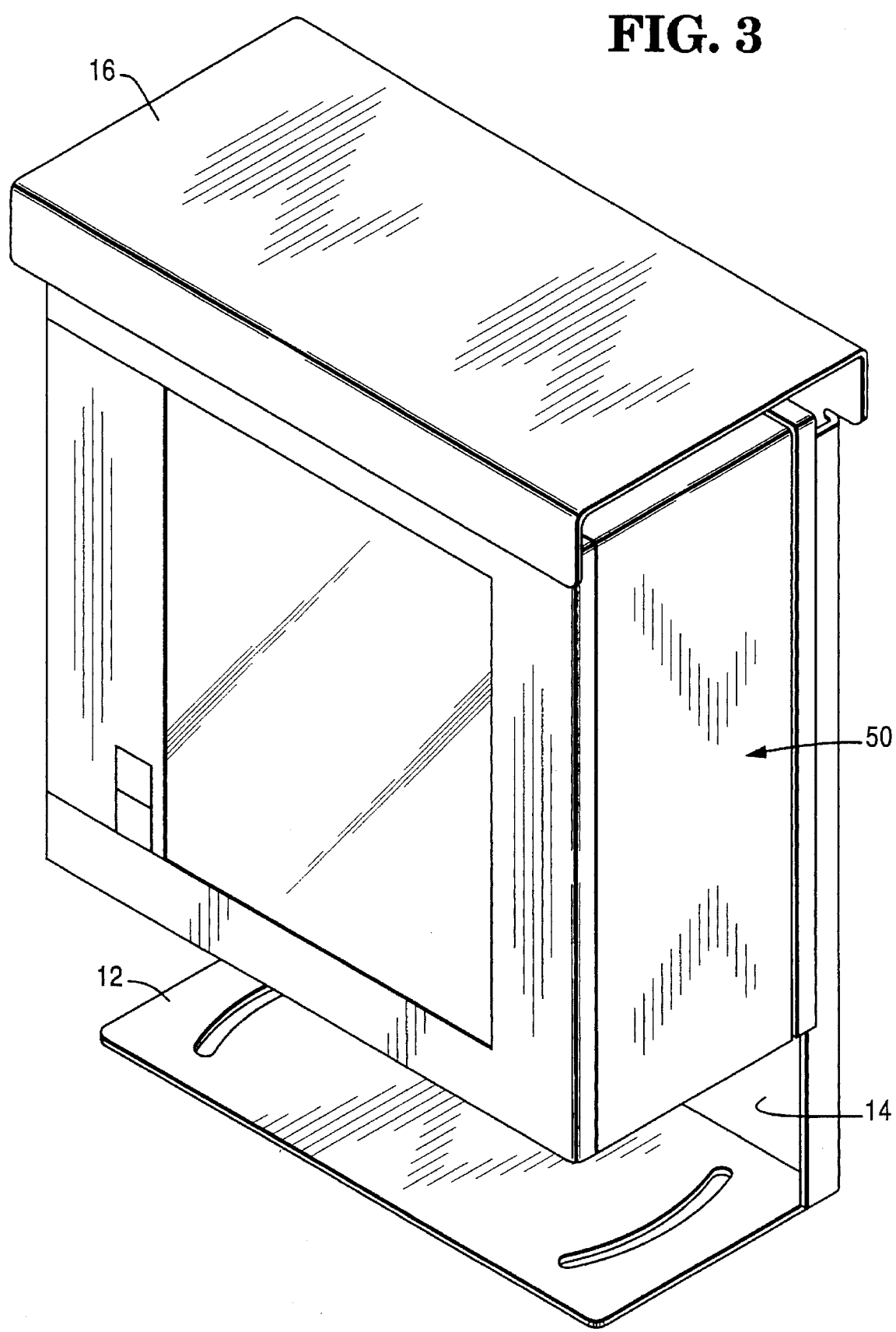
FIG. 3 is a front perspective view of the combined assembly.

Turning now to FIG. 3, scanner 50 is attached to mounting bracket 10. Articles are scanned by passing merchandise items past scanner 50.

Advantageously, use of separate mounting bracket 10 facilitates manufacture of a single scanner 50 that may be mounted in various ways, including vertically. With corresponding mounting hardware, the same scanner 50 may also be mounted horizontally in checkout counter 26 with or without a scale.

Although the present invention has been described with particular reference to certain preferred embodiments thereof, variations and modifications of the present invention can be effected within the spirit and scope of the following claims.

What is claimed is:

1. A bar code scanner assembly comprising:

a bar code scanner having a generally box-like housing including a back surface and a front surface containing a scanning aperture which emits scanning light beams;

wherein the scanner is designed to be mounted in a generally horizontal orientation within a checkout counter, such that the front surface of the housing is flush with a top surface of the checkout counter, and in a substantially vertical orientation on top of the checkout counter, such that the front surface of the housing is generally vertical; and a mounting bracket including a bottom wall which fastens to the top surface of the checkout counter, and a vertical wall coupled to the bottom wall;

wherein the vertical wall of the mounting bracket couples to the back surface of the housing placing the scanner in the substantially vertical orientation on the checkout counter.

2. A bar code scanner assembly comprising:

a bar code scanner having a generally box-like housing including a back surface and a front surface containing a scanning aperture which emits scanning light beams;

wherein the scanner is designed to be mounted in a generally horizontal orientation within a checkout counter, such that the front surface of the housing is flush with a top surface of the checkout counter, and in a substantially vertical orientation adjacent the top surface of the checkout counter, such that the front surface of the housing is generally vertical; and a mounting bracket which couples the bar code scanner to the checkout counter and places the scanner in the substantially vertical orientation.

3. A bar code scanner assembly comprising:

a bar code scanner having a generally box-like housing including a back surface, a front surface containing a scanning aperture which emits scanning light beams, and four side surfaces;

wherein the scanner is designed to be mounted in a generally horizontal orientation within a checkout counter, such that the front surface of the housing is flush with a top surface of the checkout counter, and in a substantially vertical orientation on top of the checkout counter, such that the front surface of the housing is generally vertical; and a mounting bracket formed from a single piece of sheet metal including a bottom wall which fastens to the top surface of the checkout counter, a vertical wall oriented substantially perpendicular to the bottom wall, and a top wall oriented substantially perpendicular to the vertical wall;

wherein the vertical wall of the mounting bracket couples to the back surface of the housing and places the scanner in the substantially vertical orientation on the checkout counter with the bottom wall under one of the side surfaces of the housing and the top wall over another of the side surfaces of the housing opposite the one side surface.

* * * * *